US008447342B2

(12) United States Patent
Andrews et al.

(10) Patent No.: US 8,447,342 B2
(45) Date of Patent: May 21, 2013

(54) POWER CONTROL IN A WIRELESS COMMUNICATION SYSTEM

(75) Inventors: Edward Andrews, Bristol (GB); Jonathan Wallington, Portishead (GB); Carlo Luschi, Oxford (GB)

(73) Assignee: Icera Inc., Wilmington, DE (US)

( * ) Notice: Subject to any disclaimer, the term of this patent is extended or adjusted under 35 U.S.C. 154(b) by 408 days.

(21) Appl. No.: 12/808,169

(22) PCT Filed: Dec. 11, 2008

(86) PCT No.: PCT/EP2008/067332
§ 371 (c)(1), (2), (4) Date: Aug. 17, 2010

(87) PCT Pub. No.: WO2009/077422
PCT Pub. Date: Jun. 25, 2009

(65) Prior Publication Data

US 2010/0304779 A1 Dec. 2, 2010

(30) Foreign Application Priority Data

Dec. 14, 2007 (GB) .................................. 0724421.3

(51) Int. Cl.
*H04W 52/04* (2009.01)

(52) U.S. Cl.
USPC ......... 455/522; 455/69; 455/127.1; 455/13.4; 375/260; 375/340

(58) Field of Classification Search
USPC .................... 455/69, 522, 13.4, 67.16, 67.11, 455/67.13, 552.1, 115.1, 135, 220, 222, 226.3; 370/278, 332, 342, 318, 335, 328; 375/260, 375/340
See application file for complete search history.

(56) References Cited

U.S. PATENT DOCUMENTS

| | | | | |
|---|---|---|---|---|
| 6,950,632 | B1 * | 9/2005 | Yun et al. | 455/69 |
| 7,702,350 | B2 * | 4/2010 | Oh et al. | 455/522 |
| 2004/0137860 | A1 * | 7/2004 | Oh et al. | 455/127.1 |
| 2005/0143116 | A1 * | 6/2005 | Hsu et al. | 455/522 |
| 2005/0276248 | A1 * | 12/2005 | Butala et al. | 370/332 |
| 2007/0217348 | A1 * | 9/2007 | Tapia Moreno et al. | 370/278 |
| 2010/0197337 | A1 * | 8/2010 | Larsson et al. | 455/522 |
| 2011/0019754 | A1 * | 1/2011 | Andrews et al. | 375/260 |

FOREIGN PATENT DOCUMENTS

| | | | |
|---|---|---|---|
| WO | 03032518 | A1 | 4/2003 |
| WO | 2009077422 | A1 | 6/2009 |

* cited by examiner

*Primary Examiner* — Tan Trinh

(57) ABSTRACT

A method of power control in a wireless communication system, wherein blocks are transmitted from a transmitter to a receiver via a wireless transport channel. The method comprises comparing a target signal quality value with a received signal quality value and providing the results of the comparing step to the transmitter to adjust transmit power based on the comparing step. The target signal quality value is set by the following steps: determining an initial target value; detecting if a data block has been received; detecting if received blocks have been successfully decoded; and decreasing the target value when pass blocks are received and increasing the target value when failed blocks are received subject to monitoring a period of inactivity on the transport channel in which no blocks are received.

25 Claims, 5 Drawing Sheets

POWER CONTROL IN A WIRELESS COMMUNICATION SYSTEM

CROSS-REFERENCE TO RELATED APPLICATIONS

This application is the National Stage of, and therefore claims the benefit of International Application No. PCT/EP2008/067332 filed on Dec. 11, 2008, entitled "POWER CONTROL IN A WIRELESS COMMUNICATION SYSTEM," which was published in English under International Publication Number WO 2009/077422 on Jun. 25, 2009, and has priority based on GB 0724421.3 filed on Dec. 14, 2007. Each of the above applications is commonly assigned with this National Stage application and is incorporated herein by reference in their entirety.

TECHNICAL FIELD

The present invention relates to power control in a wireless communication system.

BACKGROUND

FIG. 1 is a schematic block diagram indicating the main functional components of a wideband code division multiple access (WCDMA) receiver. Reference numeral 2 denotes an antenna which receives a wireless transmission and supplies it in analog form to RF and IF stages 4. A receiver front end 6 includes the functions of analog to digital conversion and supplies digital samples to a signal detection block 8. The signal detection block 8 can be implemented in a number of ways and is responsible for de-scrambling and de-spreading the received coded signal samples. For each time slot a block is received which comprises a plurality of transport channels (TrCH) multiplexed onto a WCDMA dedicated physical channel (DPCH). As shown in FIG. 1, after signal detection and channel decoding the decoded data bits are supplied to a Cyclic Redundancy Check (CRC) block 12. The CRC check indicates whether or not the data block has been correctly decoded.

For interference-limited wireless systems, such as those based on CDMA technology, link adaptation is performed by a Transmit Power Control (TPC) mechanism, which ensures that sufficient but not excessive power is transmitted to achieve an adequate received signal quality. In a 3GPP WCDMA system, the power control mechanism comprises two parts: 1) a so-called "outer-loop" algorithm 14 that sets and adjusts a target signal-to-interference power ratio (SIR) in order to meet a Block Error Rate (BLER) target set by a network; and 2) a so-called "inner-loop" algorithm 16 that provides fast feedback to the transmitter in order that the transmitter can adjust its transmitted signal power so that the receiver SIR target is met. The inner-loop transmit power control 16 is typically based on the comparison between a target SIR ($SIR_{target}$) and an SIR estimated from the received signal ($SIR_{est}$). The outer-loop mechanism 14 increases or decreases the SIR target in response to the receipt of block error information, which is typically derived by the pass/fail of the CRC check 12. If a data block is received correctly (CRC pass) then the SIR target is decreased; if a data block is received incorrectly (CRC fail) then the SIR target is increased. In a typical implementation, the amount the SIR target is decreased following a correctly decoded block is equal to some step size (in dB) multiplied by the target block error rate, and the amount the SIR target is increased following an incorrectly decoded block is equal to the step size multiplied by one minus the target block error rate. For example, for a 10% BLER target and a 1 dB step size, the SIR target will be decreased by 1*0.1=0.1 dB following a good block and increased by 1*(1−0.1)=0.9 dB following a bad block. This has the effect that, for typical BLER targets, many more good blocks are required to lower the target than bad blocks to raise it by the same amount. In normal circumstances, the inner-loop power control is able to adjust the transmitted power to meet the new target in a short period (in WCDMA the power can be changed by 1 dB per slot). However, under certain conditions, such as when the transmitter has reached its maximum allowed transmit power, it may be the case that the SIR achieved at the receiver is lower than the target SIR for an extended period of time such that multiple data blocks are received while the condition pertains. In those conditions bad (CRC failed) blocks are likely, and the effect of them is to further raise the SIR target progressively higher with respect to the achieved SIR, for no benefit. When conditions return to normal following such a period (e.g., because the receiver has moved closer to the transmitter), the SIR target will be excessively high and the inner-loop will adjust the transmit power so that it is higher than necessary to achieve the desired BLER. To avoid such situations a so called "anti-windup" mechanism may be employed to limit how high the SIR target may rise above the measured achieved SIR. Following an SIR target increase (CRC fail), the anti-windup algorithm inhibits a further SIR target increase until the measured SIR has tracked the target variation. Performance requirements for such a mechanism in the User Equipment (UE) receiver are specified in 3GPP TS 25.101, "Technical Specification Group Radio Access Network: User Equipment (UE) radio transmission and reception (FDD)", June 2004, Section 8.8.3.

On a 3GPP WCDMA downlink Dedicated Physical Channel (DPCH), Transport Format Combination Indicator (TFCI) bits (3GPP TS 25.211, "Technical Specification Group Radio Access Network: Physical Channels and Mapping of Transport Channels onto Physical Channels (FDD)", December 2005, Section 5.3.2) are transmitted to indicate to the UE receiver which element of a finite, pre-defined Transport Format Combination Set (TFCS) is employed on the current frame. The Transport Format Combination (TFC) provides information on the number of transport blocks, their size, origin (transport channel), coding scheme, rate matching attributes, etc. for the UE to use in decoding the received data. For high spreading factor (i.e. low bandwidth) DPCHs, the number of TFCI bits may be a significant proportion of the whole transmitted DPCH slot. For instance, for Slot Format 3 (ibid., Table 11) there are 2 TFCI bits per slot out of only 20 bits, corresponding to a 10% overhead. Under certain circumstances (3GPP TS 25.211, "Technical Specification Group Radio Access Network: Multiplexing and channel coding (FDD)", June 2006, Sections 4.3.1 and 4.3.1a) it is permissible to omit the TFCI bits to save bandwidth, in which case the UE is required to infer which TFC was used by performing some processing of the received data. This process is known as Blind Transport Format Detection (BTFD). A special case of BTFD is single transport format detection, in which there are only two possible transport formats per Transport Channel (TrCH): either no data or a single block of data (with CRC attached). Although the 3GPP standard specifies a BTFD performance test (3GPP TS 25.101, "Technical Specification Group Radio Access Network: User Equipment (UE) radio transmission and reception (FDD)", June 2004, Section 8.10) which requires that false detections (i.e., events where the wrong TFC is identified) should occur at a rate lower than $10^{-4}$, the test does not apply to single format detection so there is no requirement that the false alarm rate be low in that case. Indeed, under certain channel conditions it may be a necessary compromise to have a non-negligible false alarm rate in order to achieve an acceptable detection rate.

Single format BTFD false alarms pose a significant problem to the correct functioning of outer-loop power control. It is common in real-world scenarios to find large periods of time where no data is transmitted on a particular TrCH (e.g., on a TrCH used only for signaling data). In such conditions, a succession of false alarms, which appear as blocks of data with bad CRCs, cause the SIR target to increase monotonically, until blocked by the anti-windup mechanism, as there are no good blocks received on that TrCH to lower the target. Even when the anti-windup mechanism stops the target SIR from rising, the transmitted power may be higher than necessary. This result has a negative effect on cell performance and may lead to the offending UE having its call dropped by a Radio Resource Management (RRM) algorithm at the base station transmitter or Radio Network Controller (RNC).

SUMMARY

The aim of the present invention is to provide a power control mechanism which obviates or mitigates the foregoing disadvantages.

According to one aspect of the present invention there is provided a method of power control in a wireless communication system wherein blocks are transmitted from a transmitter to a receiver via a wireless transport channel, the method comprising comparing a target signal quality value with a received signal quality value and providing the results of the comparing step to the transmitter to adjust transmit power based on the comparing step. The target signal quality value is set by the following steps:

- determining an initial target value;
- detecting if a data block has been received;
- detecting if received blocks have been successfully decoded, and identifying the received blocks as pass or fail blocks; and
- decreasing the target value when pass blocks are received and increasing the target value when failed blocks are received subject to monitoring a period of inactivity on the transport channel in which no blocks, or only failed blocks are received and where the period of inactivity exceeds a threshold reducing a current target value to a value determined by the target value at commencement of the period of inactivity ($SIR_{t_1}$). The value determined by the target value can be a value lower than target value at commencement of the period of inactivity ($SIR_{t_1}-\Delta$). Alternatively, the target value can be reset to the same value as the initial target value ($SIR_{init}$).

According to another aspect of the invention there is provided a receiver for a wireless communications system. The receiver comprises: means for attempting to detect blocks transmitted from a transmitter to the receiver via a wireless transport channel and detecting if blocks have been successfully decoded, and identifying the blocks pass or fail; means for generating a target signal quality value by decreasing the target value when pass blocks are received and increasing the value when failed blocks are received; means for comparing the target signal quality value with a received signal quality value and providing the result of the comparing step to the transmitter to adjust transmit power based on the comparing step; and means for monitoring a period of inactivity on the transport channel in which no blocks, or only failed blocks are received and means operable to adjust the target value so that where the period of inactivity exceeds a threshold, the current target value is reduced to a value determined by the target value at commencement of the period of inactivity ($SIR_{t_1}$).

Another aspect also provides a wireless communication system comprising a receiver as defined hereinabove and a transmitter wherein the transmitter is operable to adjust the transmit power based on the result of comparing the target signal quality value of the received signal quality value.

BRIEF DESCRIPTION OF THE DRAWINGS

For a better understanding of the present invention and to show how the same may be carried into effect, reference will now be made by way of example to the accompanying drawings, in which.

DETAILED DESCRIPTION

Figure 2:
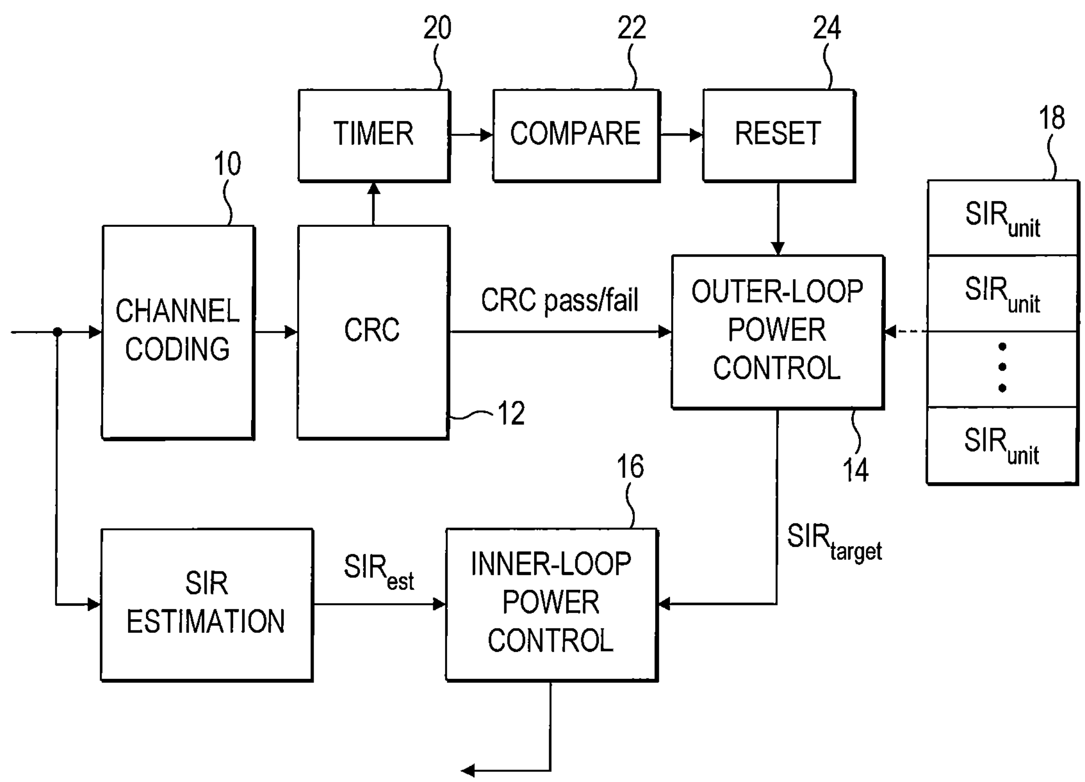
FIG. 2 is a schematic block diagram of an embodiment of the present invention.

Those skilled in the art to which this application relates will appreciate that other and further additions, deletions, substitutions and modifications may be made to the described embodiments. FIG. 2 is a schematic block diagram of an embodiment of the present invention shown as functional blocks. It will readily be appreciated that in practice these blocks can be implemented by software or firmware in a suitably programmed processor.

Figure 1:
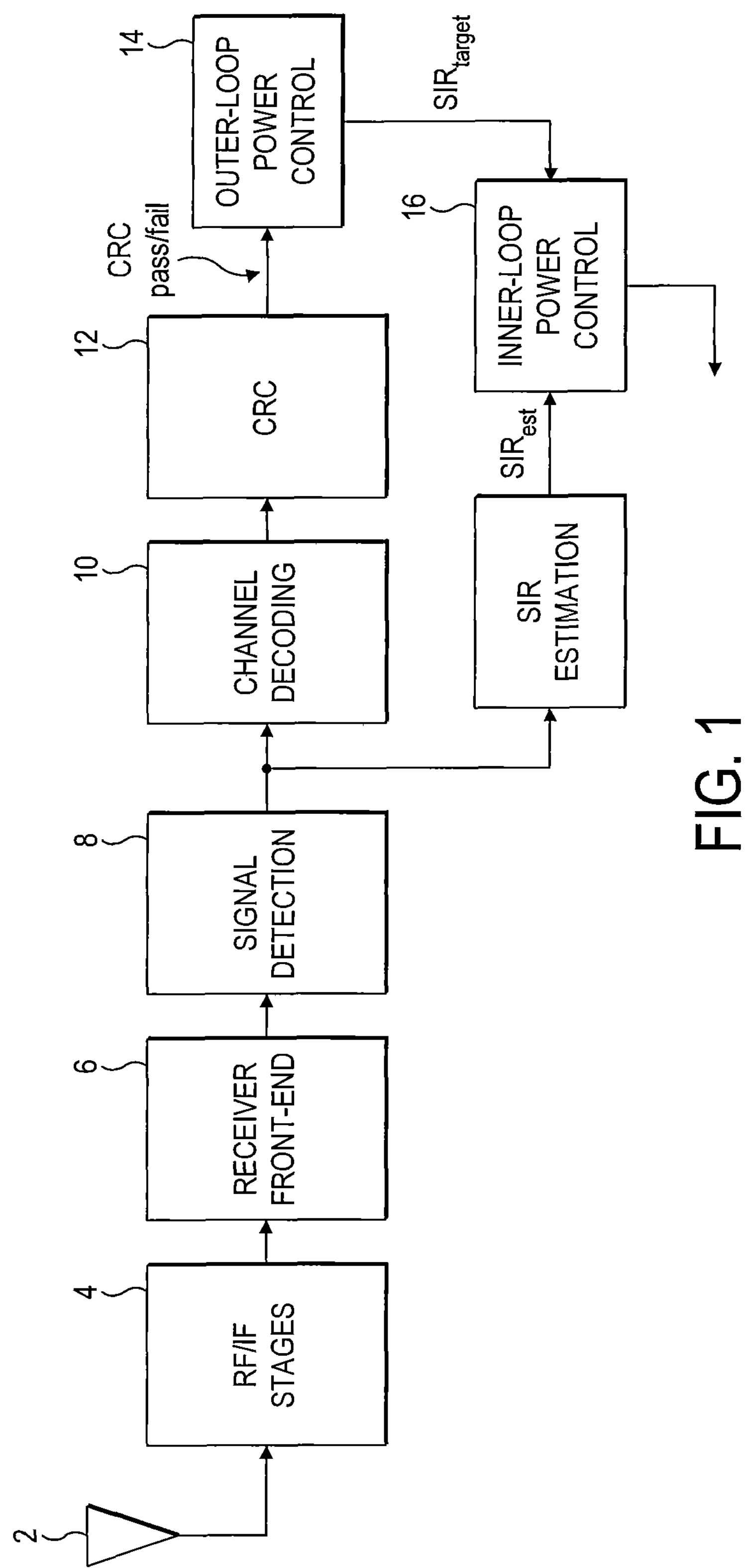
FIG. 1 is a schematic block diagram of a WCDMA receiver.

FIG. 2 shows the channel decoding block 10, the CRC check block 12, the outer-loop power control block 14 and the inner-loop power control block 16 as in FIG. 1 already discussed. The described embodiment of the present invention provides a modified anti-windup mechanism which is particularly useful in conjunction with single format blind transport format detection (BTFD). It will readily be appreciated however that the aspects of the invention discussed herein can be used in other circumstances where there is potential for "false alarms", i.e., detection error events where no data is received but the receiver mistakenly assumes that a data block has been transmitted, tries to decode it and deems it to be a bad block.

The outer-loop power control block 14 maintains and uses a separate SIR target for each transport channel (TrCH) multiplexed onto a dedicated physical channel (DPCH). These targets are held in memory block 18.

The set of TrCH SIR targets is initialised to some set of typical values $\{SIR_{init}\}$ at call setup, where the value of $SIR_{init}$ for a particular TrCH may depend upon a number of factors related to, for instance, the properties of the DPCH (e.g., spreading factor) or the properties of the TrCH (e.g., BLER target). The SIR target used by the inner-loop power control and by the anti-windup mechanism is calculated from these constituent targets (e.g., by taking the instantaneous largest target).

FIG. 2 also illustrates additional components in accordance with an embodiment of the present invention in the form of a timer function 20, a compare function 22 and a reset function 24.

Figure 3:
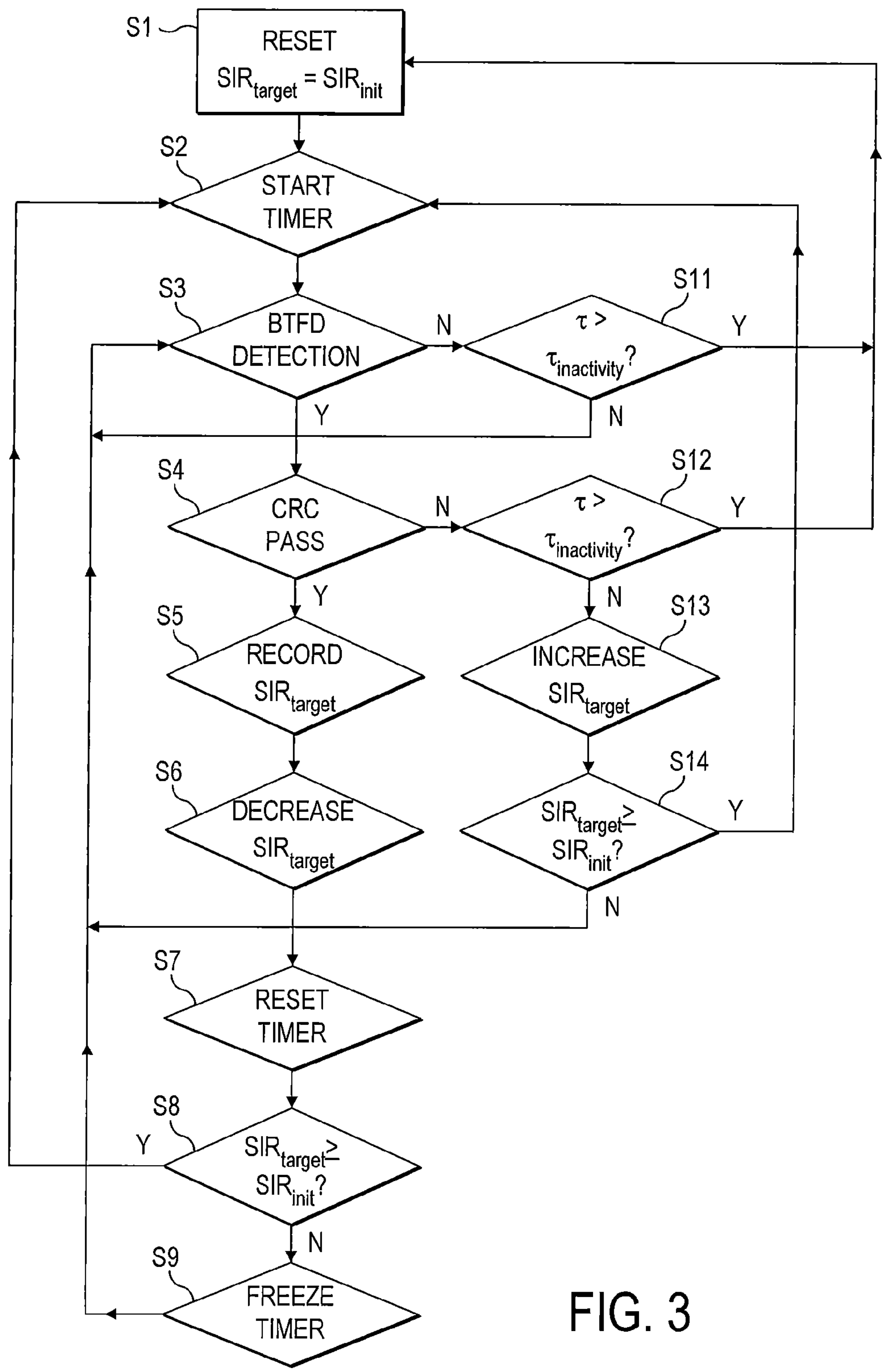
FIG. 3 is a flow chart illustrating a method in accordance with an embodiment of the invention.

FIG. 3 is a flow chart illustrating a method of setting the SIR target for use by the inner-loop power control 16 using the functions illustrated in FIG. 2.

For each TrCH, a quantity $SIR_{init}$ is selected to be used as an initial value of the SIR target for that TrCH. At a step S2, for each TrCH, a timer is started when the TrCH is initiated. A step S3 performs BTFD, which detects whether a data block has been received. CRC detection is implemented at a step S4.

For each TrCH, in correspondence to a CRC pass (Y at step S4), the TrCH's current SIR target is recorded (step S5), the SIR target is decreased (step S6), and the TrCH's timer is reset to zero (step S7). The manner in which the SIR target is decreased is as discussed above with reference to FIG. 1. If the TrCH's SIR target is above a certain value (for example, $SIR_{init}$) (step S8), the TrCH's timer is restarted (back to step S2), else the timer remains frozen (step S9) until the SIR target reaches a certain value (for example, $SIR_{init}$) and is then restarted.

The maximum allowed value of a TrCH's timer shall be $\tau_{inactivity}$, the value of which is a design parameter: $\tau_{inactivity}$ shall be short enough that the probability of the SIR target rising excessively is small (or short enough that the probability of a very negative effect due to the rise of the SIR target is small) but long enough that sufficient time is allowed for the SIR target to rise to an acceptable level following the reception of actual data which is in error due to poor SIR. When no data is detected at the BTFD detection step (N at step S3), or in correspondence to a CRC fail (N at step S4), the lapsed time is compared with $\tau_{inactivity}$ (respectively steps S11 and S12). For a CRC fail, when $\tau<\tau_{inactivity}$ (N at step S12), the SIR target is increased in a manner as described with reference to FIG. 1 in the introductory portion hereto (step S13). For both the cases of no data and CRC fail, when $\tau_{inactivity}$ is reached for a TrCH (Y at steps S11 and S12), the TrCH's SIR target shall revert to the value recorded at the start of the inactivity period, or to the value recorded at the start of the inactivity period less some amount $\Delta$ (step S1).

Figure 4:
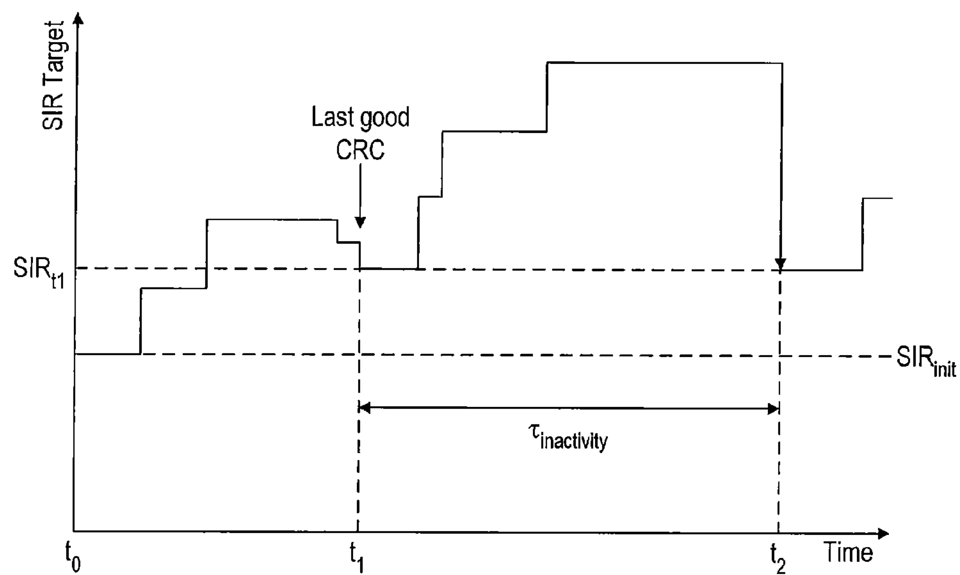
FIGS. 4 to 7 are timing diagrams illustrating the effect on the SIR target of implementing embodiments of the invention.

FIG. 4 is a timing diagram illustrating the effect of these steps on the level of the SIR target for a particular transport channel. Time $t_0$ represents the start of block transmission, where the SIR target starts initially at $SIR_{init}$. As can be seen from FIG. 4, the SIR target rises in steps due to the receipt of bad blocks and then reduces when good blocks start to arrive. Time $t_1$ denotes receipt of a good block prior to a following succession of bad blocks and no data blocks. Each time a bad block is received, the SIR target is increased as shown by the subsequent steps in FIG. 4. However, at time $t_2$ the lapsed time $\tau$ has exceeded the value $\tau_{inactivity}$ and the SIR target is reduced to the value $SIR_{t_1}$ which was recorded at time $t_1$.

Figure 5:
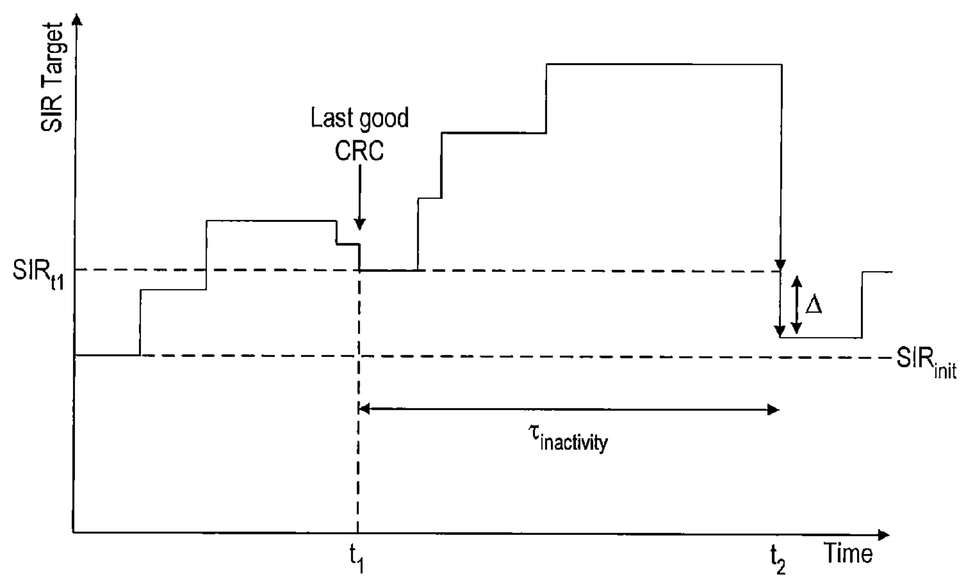
Figure 6:
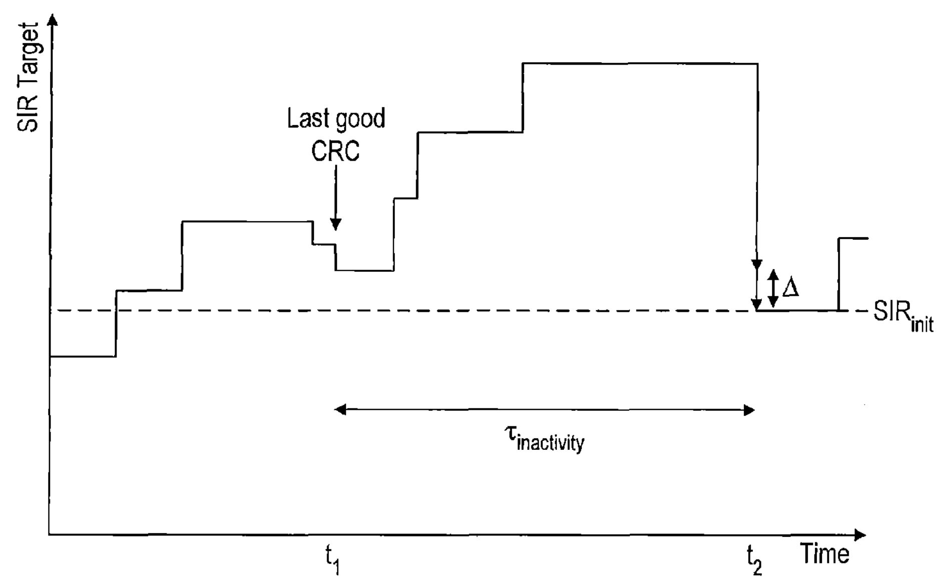

FIG. 5 illustrates the timing diagram for an alternative embodiment of the invention in which the SIR target is reverted to its value $SIR_{t_1}$ at time $t_1$, corresponding to the start of the period of inactivity, less a certain quantity $\Delta$. A transport channel's SIR target shall not be below a certain value (for example $SIR_{init}$) by the subtraction of $\Delta$. This is shown in FIG. 6, where the difference between the SIR target $SIR_{t_1}$ and $SIR_{init}$ is less than $\Delta$. The value of $\Delta$ used is a design parameter—the higher its value the quicker an inactive transport channel will have its SIR target reduced to $SIR_{init}$.

Figure 7:
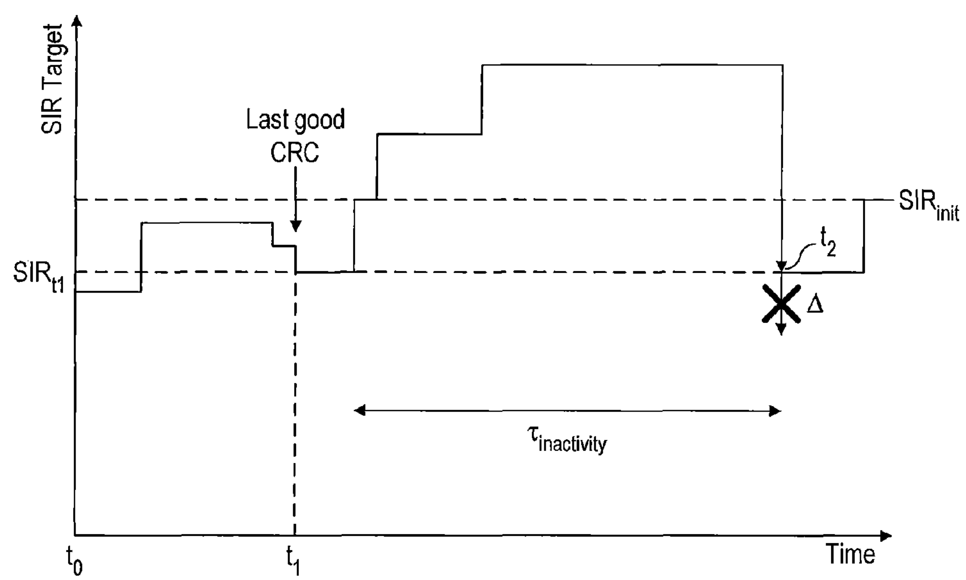

FIG. 7 is a timing diagram which shows the situation when the value of the SIR target $SIR_{t_1}$ to which the system reverts at $t_2$, the end of the period of inactivity, is below $SIR_{init}$. In this case, as $SIR_{t_1}<SIR_{init}$, we do not apply $\Delta$. This represents the option discussed at step S9 in FIG. 3 and the timer is frozen so that on receipt of the next block there is no further reduction in the SIR target. Thus, on receipt of a good block, the SIR target is not reduced because it is already below $SIR_{init}$ (which is shown by the black cross in FIG. 5) and $\tau$ is not restarted until the SIR target becomes greater than $SIR_{init}$.

The timer function 20 can be implemented as a clock measuring a time period or as a counter used to count the number of frames or transmission time intervals (TTIs) which have elapsed for which no good block was detected. This embodiment is described below.

A record is kept for each TrCH of the number of consecutive Transmission Time Intervals (TTIs) for which no good block (CRC pass) was detected (this includes those TTIs for which no data was detected and those for which a CRC fail was detected, either due to poor reception or false alarm) while a TrCH's SIR target exceeds a certain value (for example, $SIR_{init}$). The number of TTIs with no CRC passes is a measure of the inactivity of the associated TrCH. A record is also kept of the TrCH's SIR target at the start of the no-CRC-pass period. If a TrCH's count of consecutive TTIs without a CRC pass exceeds some threshold (which would be equivalent to $\tau_{inactivity}$), then the TrCH's SIR target is reverted to its value at the start of the period. In a variation of this embodiment, if the number of consecutive TTIs without a CRC pass exceeds the threshold, then the SIR target is reverted to its value at the start of the period minus a predefined value, so that over time the SIR targets of TrCHs with no detected activity revert to a certain value (for example, $SIR_{init}$). A TrCH's SIR target shall not be lowered below a certain value (for example, $SIR_{init}$) by this process. If a good block is received for a TrCH, then the count of TTIs without CRC passes is zeroed and normal outer loop power control is resumed.

One important design parameter of the above embodiment is represented by the threshold for the number of consecutive TTIs without CRC pass—which determines the period at which the SIR target is reset to its initial value (possibly minus a predetermined value). In a WCDMA system, this period can be suitably chosen as a compromise between on one hand minimising the amount of time the SIR is raised due to false alarms, and on the other allowing sufficient time for the SIR target to respond to a number of failed Radio Link Controller (RLC) retransmissions. In a specific embodiment of the invention, the no-CRC-pass period is set to an integer multiple of a radio frame. For instance, the algorithm can wait for an estimated inactivity of 50 frames, and then reset the SIR target to the value at the beginning of the 50-frame period, or to the value at the beginning of the 50-frame period minus 0.5 dB.

The advantage of the embodiments of the invention described above is that the SIR targets of inactive TrCHs are prevented from rising excessively high due to BTFD false alarms, thus avoiding the necessity of going into anti-windup or having an unnecessarily high SIR target and transmit power. Further, by allowing the SIR targets of inactive TrCHs to decay over time to some initial value, the effects of those inactive TrCHs on the combined SIR target are reduced so that transmit power is controlled according to the needs of the active TrCHs only. This is particularly important for the typical case where there are two TrCHs, one carrying a Signaling Radio Bearer (SRB) whose activity is bursty, with large periods of inactivity, and the other carrying a Radio Bearer (RB) with user data. Depending on the block size of the SRB data and the channel coding scheme used for the SRB transport channel, the SRB may require a higher SIR than the RB. When the SRB is active then the DPCH's SIR target should be high enough to service the SRB, but when it is not then the DPCH SIR target should be able to take into account only the RB's target.

What is claimed is:

1. A method of power control in a wireless communication system wherein blocks of a transport channel are transmitted from a transmitter to a receiver via a wireless transmission channel, there being a period of time where no data blocks are transmitted for that transport channel, the method comprising comparing a target signal quality value with a received signal quality value and providing the results of the comparing step to the transmitter to adjust transmit power based on the comparing step, wherein the target signal quality value is set by the following steps:

determining an initial target value;

detecting if a data block has been received, said detecting generating detection error events in said period of time which appear as fail blocks;

detecting if received blocks have been successfully decoded, and identifying the received blocks as pass or fail blocks; and decreasing the target value when pass blocks are received and increasing the target value when fail blocks are received subject to monitoring a period of inactivity on the transport channel in which no blocks and fail blocks are identified and where the period of inactivity exceeds a threshold reducing a current target value to a value determined by the target value at commencement of the period of inactivity.

2. A method according to claim 1, wherein blocks are transmitted via multiple transport channels and wherein an initial target value is set for each transport channel and a signal quality target is maintained for each transport channel, the target signal quality value used in the comparing step being derived from the multiple signal quality target values.

3. A method according to claim 2, comprising the step of estimating the received signal quality value for each transport channel.

4. A method according to claim 2, wherein multiple transport channels are transmitted on the same physical channel comprising the steps of estimating one received signal quality value for multiple transport channels.

5. A method according to claim 1, wherein the target signal quality value is a signal to disturbance ratio for the channel, where the disturbance can be interference, noise, or interference plus noise.

6. A method according to claim 1, wherein the period of inactivity is monitored by a timer.

7. A method according to claim 6, comprising the step of resetting the timer when a good block is received.

8. A method according to claim 7, comprising the step of, when a good block is received, comparing the current target value with a comparison target value and resetting and restarting the timer if the current target value is greater than the comparison target value, and resetting and freezing the timer if the current target value is less than the comparison target value, in which case the timer will be restarted when the target value becomes greater than the comparison target value.

9. A method according to claim 8, wherein the comparison value is the initial target value.

10. A method according to claim 1, wherein the period of inactivity is monitored by counting the number of transmission time intervals during which no good block is detected.

11. A method according to claim 1, wherein the period of inactivity is monitored by counting the number of radio frames during which no good block is detected.

12. A method according to claim 1, wherein the value which is determined by the target value at commencement of the period of inactivity is the target value at the commencement of the period of inactivity.

13. A method according to claim 1, wherein the value which is determined by the target value at the commencement of the period of inactivity is obtained by subtracting an amount from the target value at the commencement of the period of inactivity.

14. A method according to claim 13, comprising the step of checking if the step of subtracting the amount from the target value at commencement of the period of inactivity results in a value which is less than a comparison value, and if so increasing the value to the comparison value.

15. A method according to claim 14, wherein the comparison value is the initial target value.

16. A method according to claim 1 comprising the step of determining if a block of data has been received, prior to the detecting step, using blind transport format detection.

17. A receiver for a wireless communications system, the receiver comprising:

means for detecting blocks of a transport channel transmitted from a transmitter to the receiver via a wireless transmission channel, there being a period of time where no data blocks are transmitted for that transport channel, said detecting generating detection error events in said period of time which appear as fail blocks;

means for detecting if blocks have been successfully decoded and identifying blocks as pass or fail;

means for generating a target signal quality value by decreasing the target value when pass blocks are received and increasing the value when fail blocks are received;

means for comparing the target signal quality value with a received signal quality value and providing the result of the comparing step to the transmitter to adjust transmit power based on the comparing step; and means for monitoring a period of inactivity on the transport channel in which no blocks and fail blocks are identified and means operable to adjust the target value so that where the period of inactivity exceeds a threshold, the current target value is reduced to a value determined by the target value at commencement of the period of inactivity.

18. A receiver according to claim 17, wherein said means for monitoring the period of inactivity is a clock.

19. A receiver according to claim 17, wherein the means for monitoring the period of inactivity is operable to count the number of transmission time intervals in which no good block is detected.

20. A receiver according to claim 17, wherein the means for monitoring the period of inactivity is operable to count the number of radio frames in which no good block is detected.

21. A receiver according to claim 17, comprising means for storing initial target values for multiple transport channels and maintaining separate target signal quality values for multiple transport channels, wherein the target signal quality value which is compared with the received signal quality value is derived from said multiple targets.

22. A receiver according to claim 17, comprising means for storing an amount by which the target value at commencement of the period of inactivity is reduced to obtain the value determined by the target value at commencement of the period of inactivity.

23. A wireless communication system comprising a receiver according to claim 17 and a transmitter, wherein the transmitter is operable to adjust transmit power based on the result of comparing the target signal quality value with the received signal quality value.

24. A communications system according to claim 23, wherein the result of comparing the target signal quality value with the received signal quality value is supplied to the transmitter via a wireless transport channel.

25. A receiver for a wireless communications system, the receiver comprising:

a component arranged to detect blocks of a transport channel transmitted from a transmitter to the receiver via a wireless transmission channel, there being a period of time where no data blocks are transmitted for that transport channel, said detecting generating detection error events in said period of time which appear as fail blocks;

a component arranged to detect if blocks have been successfully decoded and identifying blocks as pass or fail;

a component arranged to generate a target signal quality value by decreasing the target value when pass blocks are received and increasing the value when fail blocks are received;

a component arranged to compare the target signal quality value with a received signal quality value and providing the result of the comparing step to the transmitter to adjust transmit power based on the comparing step; and a component arranged to monitor a period of inactivity on the transport channel in which no blocks and fail blocks are identified and a component operable to adjust the target value so that where the period of inactivity exceeds a threshold, the current target value is reduced to a value determined by the target value at commencement of the period of inactivity.

* * * * *